US012682669B2

(12) United States Patent
Mouawad et al.

(10) Patent No.: US 12,682,669 B2
(45) Date of Patent: Jul. 14, 2026

(54) SYSTEM AND METHOD FOR LABELING 2D ELECTRO-OPTICAL (EO) DATA IN 3D MODEL VIA NEURAL RADIANCE FIELDS AND SIMULATORS

(71) Applicant: NORTHROP GRUMMAN SYSTEMS CORPORATION, Falls Church, VA (US)

(72) Inventors: Joseph Mouawad, El Cajon, CA (US); David Elliott, Melbourne, FL (US); Robert Noneman, Washington, DC (US); Joy Zhang, Los Angeles, CA (US)

( * ) Notice: Subject to any disclaimer, the term of this patent is extended or adjusted under 35 U.S.C. 154(b) by 293 days.

(21) Appl. No.: 18/639,340

(22) Filed: Apr. 18, 2024

(65) Prior Publication Data

US 2025/0329177 A1     Oct. 23, 2025

(51) Int. Cl.
| | |
|---|---|
| *G06V 20/70* | (2022.01) |
| *G06T 7/70* | (2017.01) |
| *G06T 17/20* | (2006.01) |
| *G06V 10/25* | (2022.01) |
| *G06V 10/56* | (2022.01) |

(52) U.S. Cl.
CPC ............... *G06V 20/70* (2022.01); *G06T 7/70* (2017.01); *G06T 17/20* (2013.01); *G06V 10/25* (2022.01); *G06V 10/56* (2022.01); *G06T 2207/20132* (2013.01)

(58) Field of Classification Search
CPC ........ G06V 20/70; G06V 10/25; G06V 10/56;
G06T 7/70; G06T 17/20; G06T 2207/20132; G06T 2210/56; G06T 15/08; G06T 15/20; G06T 17/00
See application file for complete search history.

(56) References Cited

U.S. PATENT DOCUMENTS

| | | | |
|---|---|---|---|
| 12,400,395 B2 * | 8/2025 | Moenne-Loccoz | ......................... G06T 15/506 |
| 12,417,584 B2 * | 9/2025 | Lin | .......................... G06T 17/00 |
| 2022/0239844 A1 * | 7/2022 | Lv | .......................... G06T 15/205 |

(Continued)

OTHER PUBLICATIONS

Y. -J. Yuan et al., "Interactive NeRF Geometry Editing With Shape Priors," in IEEE Transactions on Pattern Analysis and Machine Intelligence, vol. 45, No. 12, pp. 14821-14837, Dec. 2023, doi: 10.1109/TPAMI.2023.3315068. (Year: 2023).*

(Continued)

*Primary Examiner* — Andrae S Allison
(74) *Attorney, Agent, or Firm* — KATTEN MUCHIN ROSENMAN LLP

(57)     ABSTRACT
The method and system for labeling 2D data using a 3D model provides processes that include generating Neural Radiance Fields (NeRF) of a desired scene, converting the NeRF into a mesh, rendering images of the mesh in a simulator from a user-chosen new camera pose including position and orientation, labeling the newly rendered images where bounding boxes for the images are created, rendering images using the NeRF from the same user-chosen new camera pose, and overlaying the bounding boxes from the simulator onto the imagery from the NeRF. The method and system provide capability of augmenting a set of real images to create a more diverse training dataset that captures the scene and its objects from various new camera positions, while maintaining high qualities of images.

18 Claims, 6 Drawing Sheets

(56)                    References Cited

U.S. PATENT DOCUMENTS

| | | | |
|---|---|---|---|
| 2023/0130281 A1* | 4/2023 | Brown | .................. G06N 3/088 |
| | | | 345/420 |
| 2023/0230275 A1* | 7/2023 | Lin | .......................... G06T 7/70 |
| | | | 382/103 |
| 2023/0281913 A1 | 9/2023 | Rematas et al. | |
| 2024/0193850 A1* | 6/2024 | Kuang | .................. G06T 15/08 |

OTHER PUBLICATIONS

Jun-Kun Chen, Jipeng Lyu, Yu-Xiong Wang; NeuralEditor: Editing Neural Radiance Fields via Manipulating Point Clouds, Proceedings of the IEEE/CVF Conference on Computer Vision and Pattern Recognition (CVPR), 2023, pp. 12439-12448 (Year: 2023).*
Lin et al., "BARF: Bundle-Adjusting Neural Radiance Fields," Proceedings of the IEEE/CVF International Conference on Computer Vision, 2021, 11 pages (Year: 2021).*
Yuan et al., NeRF-Editing: Geometry Editing of Neural Radiance Fields, 2022 IEEE/CVF Conference on Computer Vision and Pattern Recognition (CVPR) (Year: 2022).*

\* cited by examiner

401

402        403

1

SYSTEM AND METHOD FOR LABELING 2D ELECTRO-OPTICAL (EO) DATA IN 3D MODEL VIA NEURAL RADIANCE FIELDS AND SIMULATORS

BACKGROUND

Training artificial intelligence and machine learning (AI/ML) models requires a significant amount of labeled data. Specifically, for computer vision applications, a diverse set of labeled images is crucial for the training process. Due to the high cost of aerial collection of real imagery data, platforms to generate synthetic data has been developed for training AI/ML models in computer vision technology.

Neural Radiance Fields (NeRF) is a state-of-the-art method to synthetize new views of scenes using a sparse set of input views by optimizing a volumetric scene function. The scene is represented using a neural network that takes 5D coordinates input, consisting of the spatial location of a point in space and the viewing orientation looking at the scene through that location, and generates the volumetric density and the emitted radiance or color at the location. The novel views are generated by examining 5D coordinates along camera rays to determine whether a certain density level is exhibited at the corresponding location followed by using volumetric rendering techniques to project the output colors and densities into an image.

Labeling tools such as NVIDIA Omniverse™ platform may be used to label the images rendered from the mesh of a NeRF scene. However, for example, the Omniverse™ platform cannot render high quality images from the mesh of a NeRF scene. Therefore, there is a limit to use labeling tools in conventional ways to label images while maintaining high qualities of images. Labeling images from NeRF meshes by using, for example, Omniverse™ platform and rendering them in high quality have been a challenge that needs to be addressed.

SUMMARY

The purpose of the disclosed invention is to provide a method and system to generate synthetic labeled images to extend and diversify an existing dataset of real images, to further increase or improve the training capability of computer vision models by providing more labeled data, to increase models' accuracy, and to reduce time and cost of collecting a large number of aerial images to cover the photographed scenes from new angles and depths. The method and system of the disclosed invention also provide labeled images that maintain high qualities of images.

The disclosed invention aims to solve the problem of labeling synthetic images to enable the automation of augmenting training datasets for computer vision applications. The method and system of the disclosed invention provide capability to generate labels and to create bounding boxes in a 3D simulator platform such as NVIDIA Omniverse™ within a 2D image rendered at a certain camera pose looking at the NeRF scene mesh generated by a 3D modeler platform such as instant-NGP, and to use the camera pose to generate a high-quality image, for example, in the Instant-NGP that is aligned with the image that the Omniverse™ have generated at the desired angle, and therefore to have the bounding boxes aligned perfectly with the corresponding objects in the image rendered by the Instant-NGP.

Moreover, the method and system of the disclosed invention allow the augmentation of labeled imagery datasets without the need for additional aerial footage collection flights for Electro-Optical (EO) data. Collecting aerial footage for the EO data is a costly process. For example, a flight cost increases with the time of the flight. Consequently, lengthened flight time to cover all angles of the scene may increase the cost dramatically. The method and system of the disclosed invention enable to generate new images for labeling from existing images of the scene from different angles, and therefore, to augment a dataset and help to improve the performance of models with reduced cost.

These advantages and others are achieved, for example, by a method for labeling 2D data by using a 3D model. The method includes steps of capturing images and/or videos of a desired object or scene by using one or more imaging devices, collecting images of the desired object or scene from the captured images and/or videos, generating and optimizing Neural Radiance Fields (NeRF) of the desired object or scene based on the collected images of the desired object or scene by using a 3D modeler platform, converting the NeRF into a mesh via the 3D modeler platform, generating one or more new camera poses comprising positions and orientations of cameras where the one or more new camera poses include poses that are not used for the collected images, generating labels for the mesh via a 3D simulator platform where the labels include bounding boxes around the desired objects, rendering labelled images from the mesh from one or more of the new camera poses via the 3D simulator to create labeled synthetic images, rendering synthetic images from the NeRF via the 3D modeler platform by using the new camera poses, and overlaying bounding boxes of the synthetic images rendered from the mesh with corresponding synthetic NeRF views.

These advantages and others are also achieved, for example, by a system for labeling 2D data using a three-dimensional (3D) model. The system includes one or more imaging devices configured to capture images and/or videos of a desired object or scene, and at least one computing device coupled to the one or more imaging devices to receive the captured images and/or videos. The at least one computing device includes at least one processor and one or more non-transitory computer readable media including instructions that cause the at least one processor to execute operations to label 2D data using a 3D model. The operations include steps of receiving the captured images and/or videos from the one or more imaging devices, collecting images of the desired object or scene from the captured images and/or videos, generating and optimizing Neural Radiance Fields (NeRF) of the desired object or scene based on the collected images of the desired object or scene by using a 3D modeler platform, converting the NeRF views into a mesh via the 3D modeler platform, generating one or more new camera poses including positions and orientations of cameras where the one or more new camera poses include poses that are not used for the collected images, generating labels for the mesh via a 3D simulator platform where the labels include bounding boxes around the desired objects, rendering labeled images from the mesh from one or more of the new camera poses via the 3D simulator to create labeled synthetic images, rendering synthetic images from the NeRF via the 3D modeler platform by using the new camera poses, and overlaying bounding boxes of the synthetic images rendered from the mesh with corresponding synthetic NeRF views.

The NeRF views may be converted into images in mesh views by using a marching cubes algorithm. The labeling the generated synthetic images from the mesh may include steps of identifying the mesh representing the desired objects, calculating the bounding boxes for the for the desired objects based on their positions, and cropping out the sections of the images in mesh. The synthetic images in mesh views may include views of the desired object or scene that are not included in the collected images. The operations may further include obtaining field of view (FOV) for the new camera poses based on the camera's horizontal aperture, resolution height and width, height, and focal length which are provided by the 3D simulator. The operations may further include converting a data format of the 3D simulator platform into a data format of the 3D modeler platform where the data formats of the 3D simulator platform and the 3D modeler platform include information of the one or more new camera poses and the FOV.

The 3D modeler platform may include instructions that cause at least one processor to execute operations to generate and optimize the NeRF of the desired object or scene based on the collected images of the desired object or scene, which may include generating sampling points of each pixel of the collected images of the desired object or scene where each sampling point is represented by a spatial location and a viewing orientation along a camera ray, and producing an output set of a density and a color of each sampling point based on the location and viewing orientation of the sampling point. The 3D simulator platform may include instructions that cause at least one processor to execute operations comprising labeling process of images, which may include steps of obtaining positions of desired objects from the mesh representing the desired 9 objects, creating new mesh objects to represent the targets as seen on mesh by use of the positions, generating bounding boxes and rendering labeled synthetic images from the mesh and targets, by converting the 3D positions into 2D based on camera position and angle.

BRIEF DESCRIPTION OF THE DRAWINGS

The preferred embodiments described herein and illustrated by the drawings hereinafter are included to illustrate and not to limit the invention, where like designations denote like elements.

DETAILED DESCRIPTION

Figure 1A:
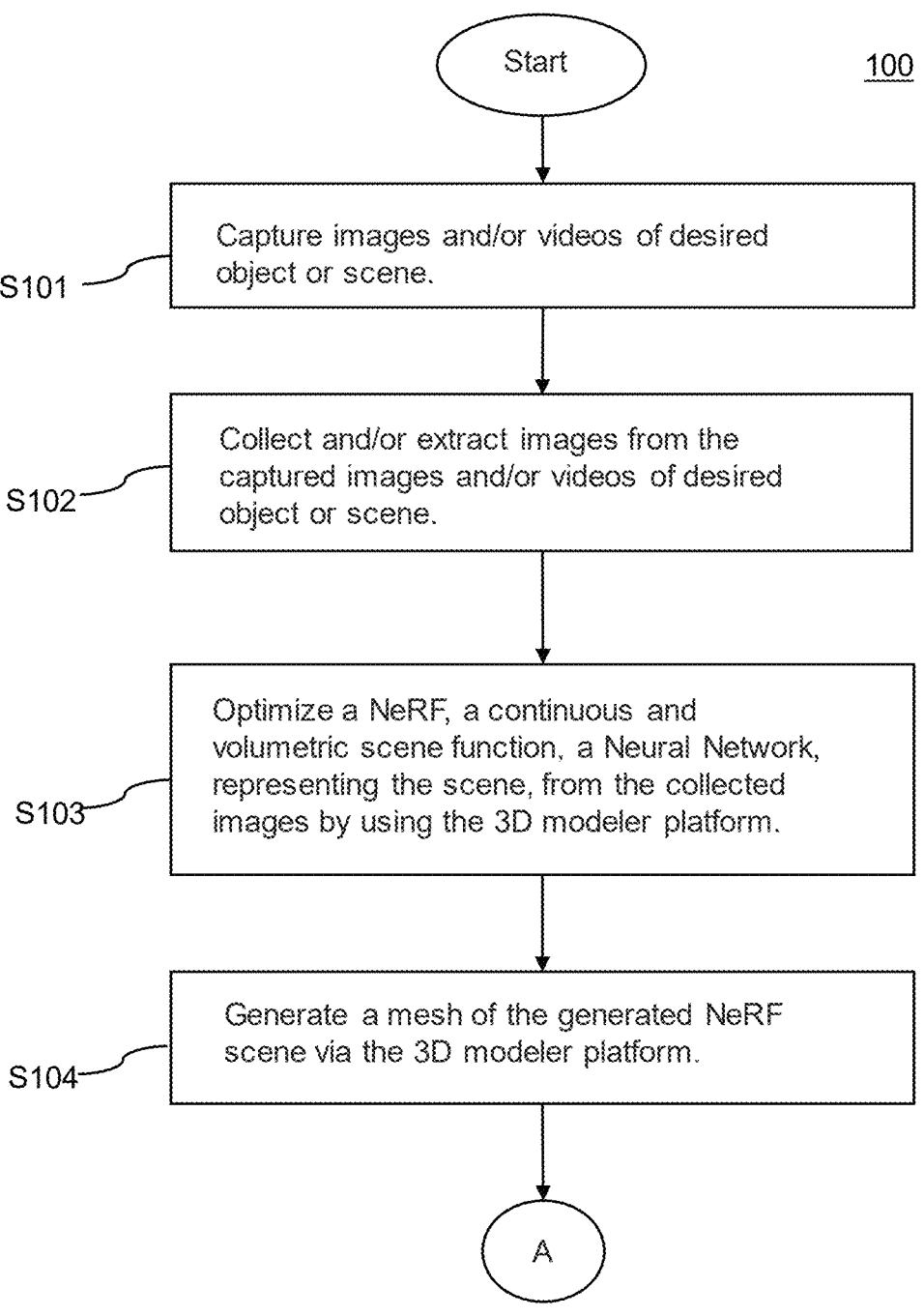
FIGS. 1A-1B are workflow diagrams of a method of the disclosed invention for labeling two-dimensional (2D) electro-optical (EO) data using a three-dimensional (3D) model.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

Artificial intelligence and machine learning (AI/ML) require a significant number of labeled data to train AI/ML models. For example, in computer vision applications, a diverse set of labeled images is crucial for the training process. The disclosed invention provides a method and system to generate synthetic images to extend and diversify an existing dataset of real images that are captured by imaging devices, providing further training capability of computer vision models to increase AI/ML models' accuracy.

Figure 1B:
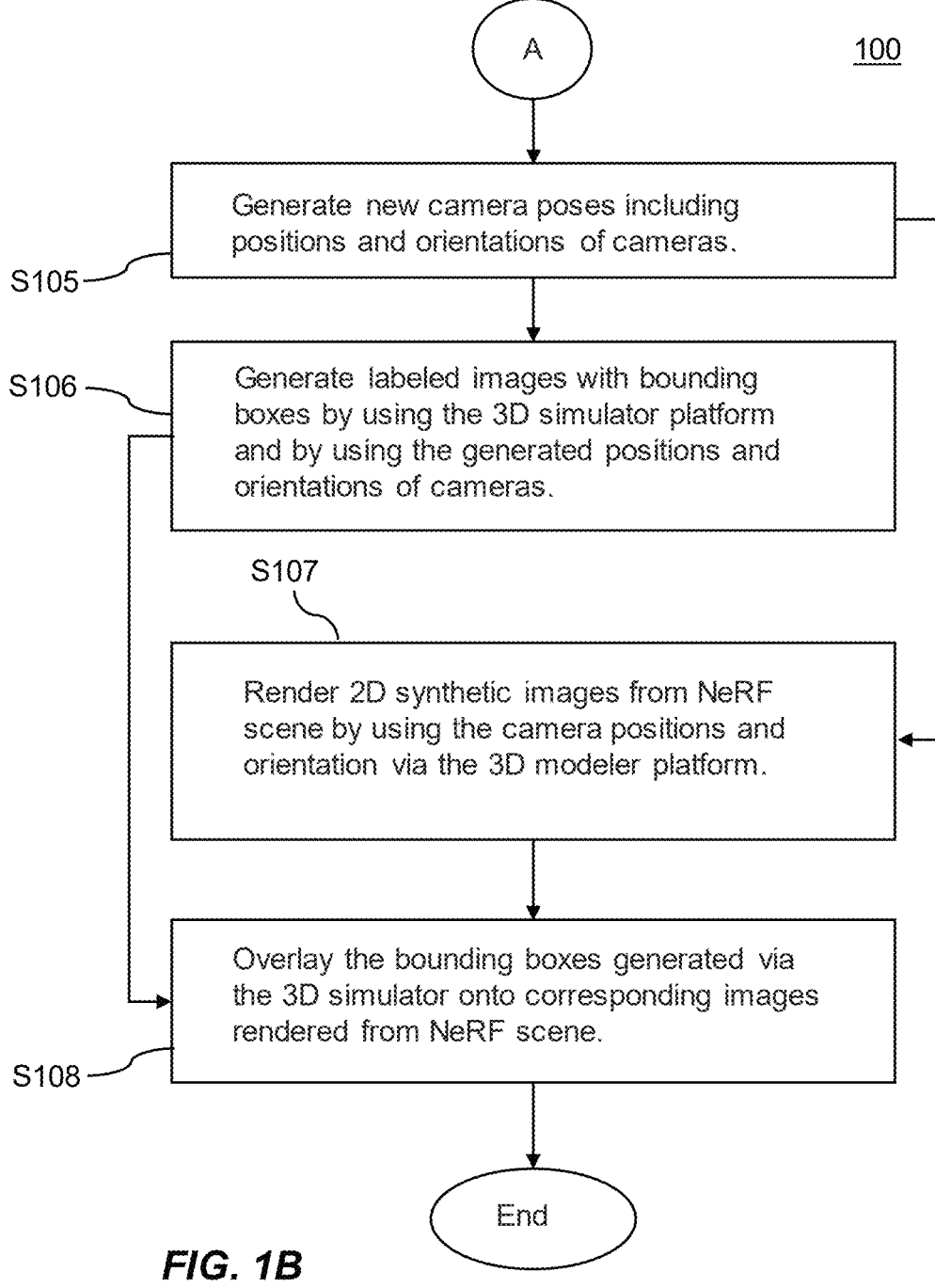
Figure 2:
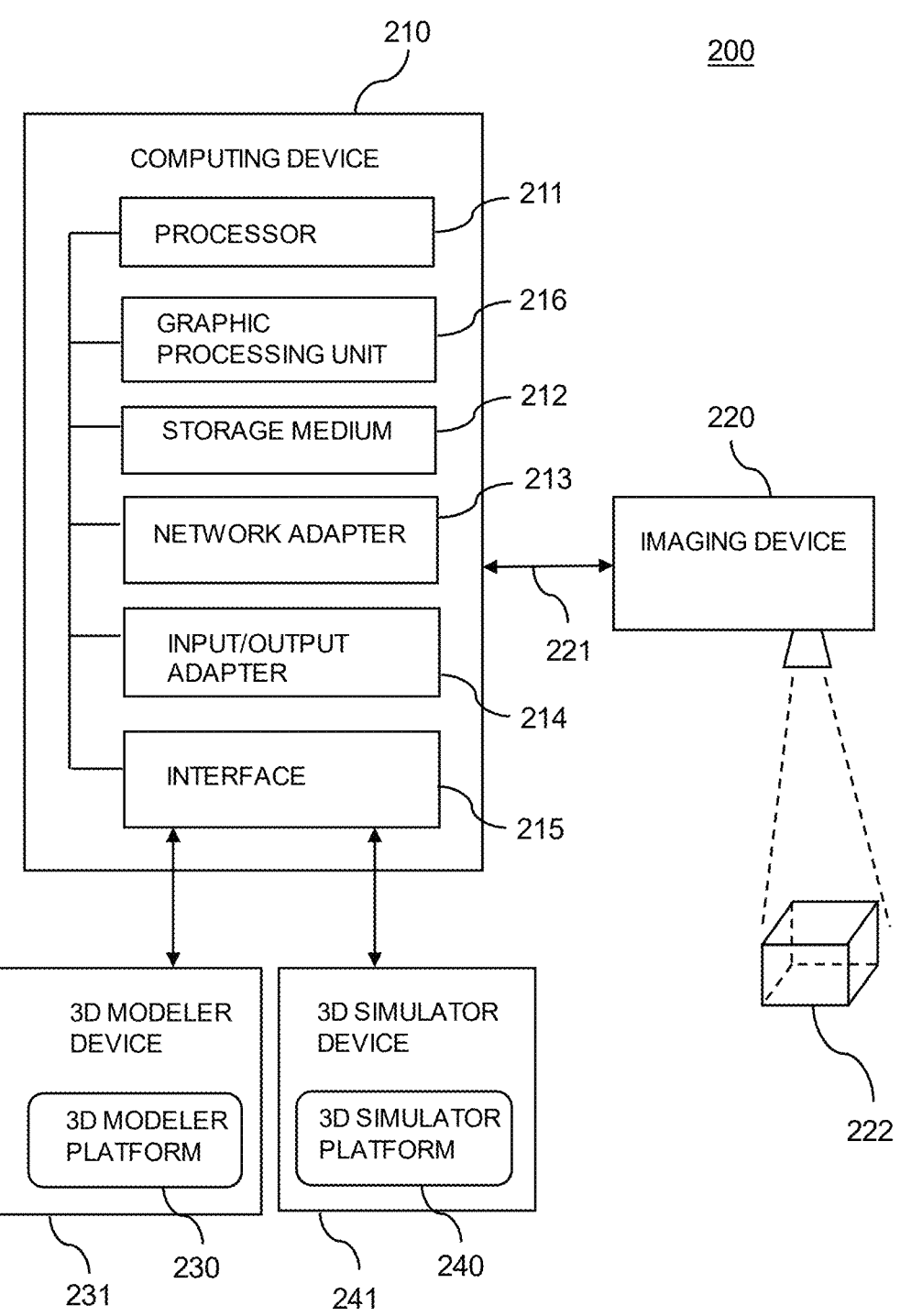
FIG. 2 is a diagram of an embodiment of a system of the disclosed invention, which is configured to render and label 2D electro-optical (EO) data using a 3D model.
Figure 3:
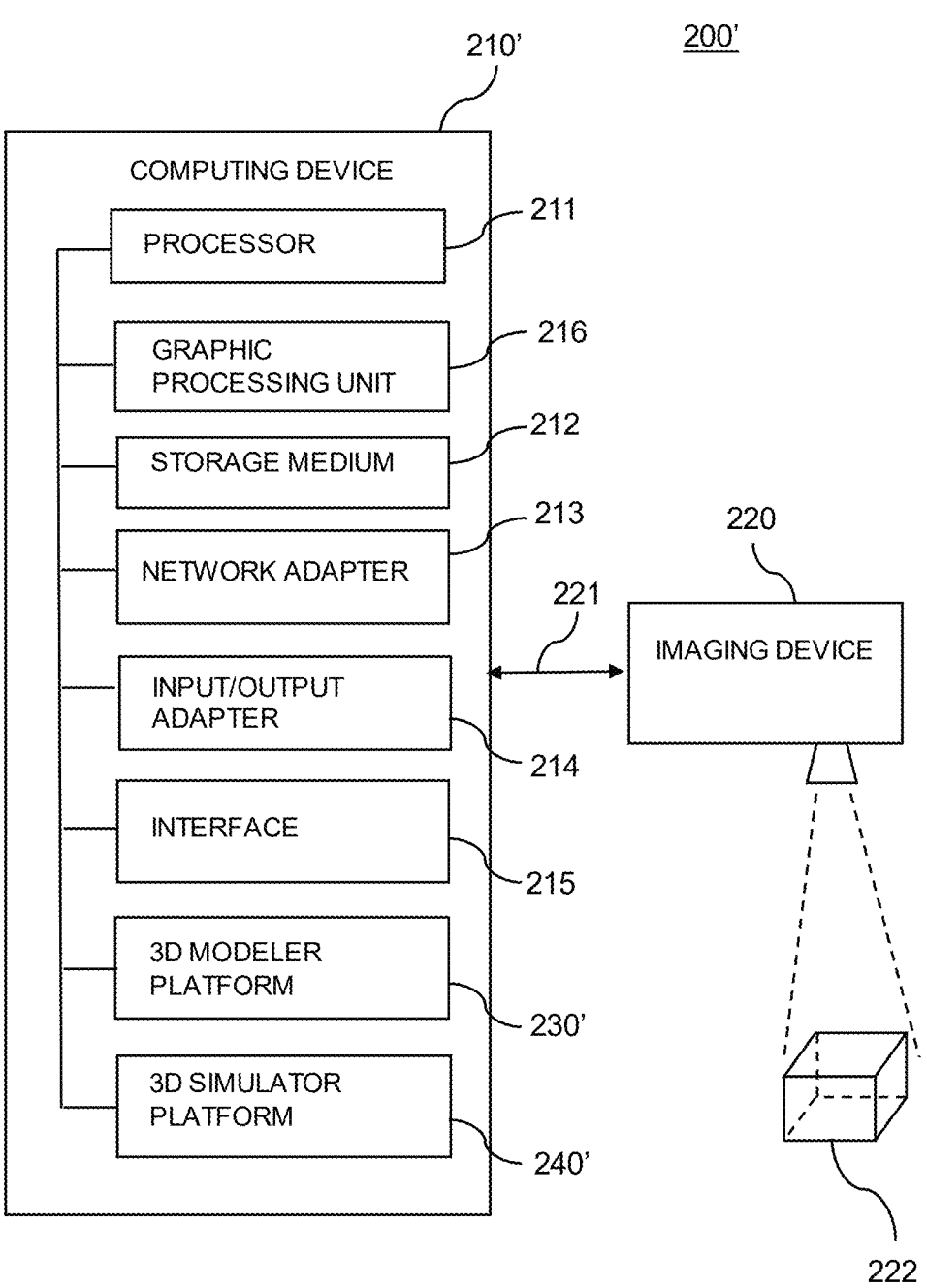
FIG. 3 is a diagram of another embodiment of the system of the disclosed invention, which is configured to render and label 2D electro-optical (EO) data using a 3D model.
Figure 4A:
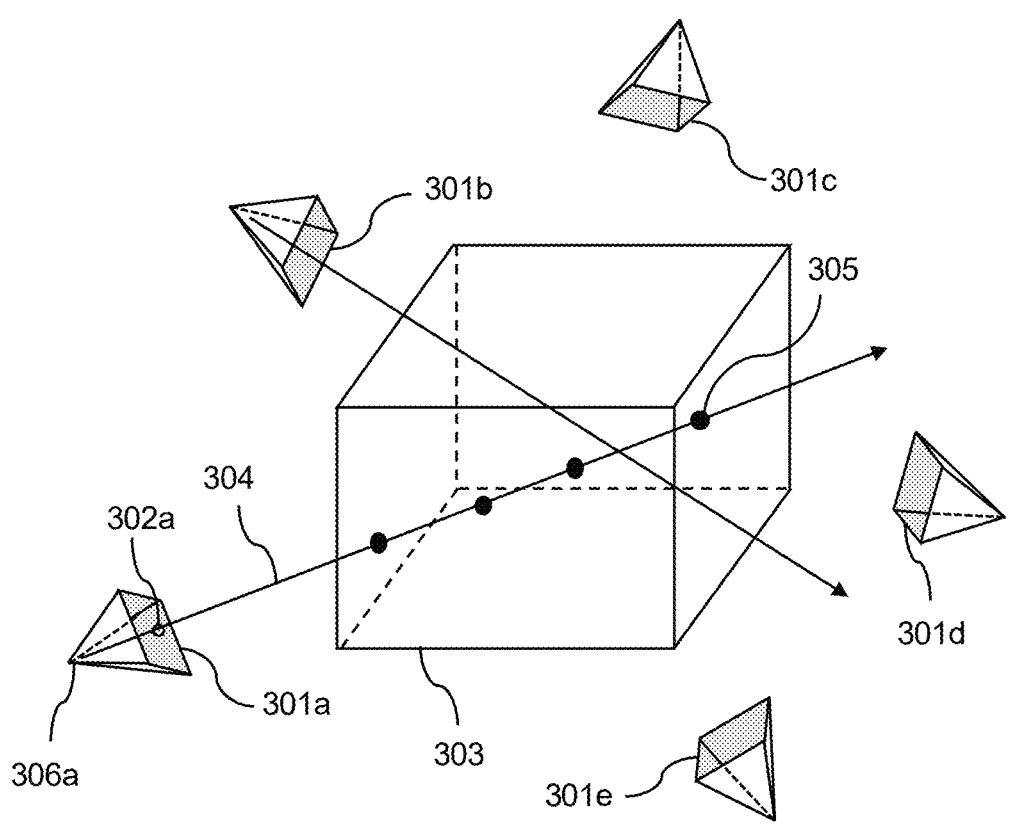
FIGS. 4A-4B are diagrams illustrating Neural Radiance Fields (NeRF) processes.
Figure 4B:
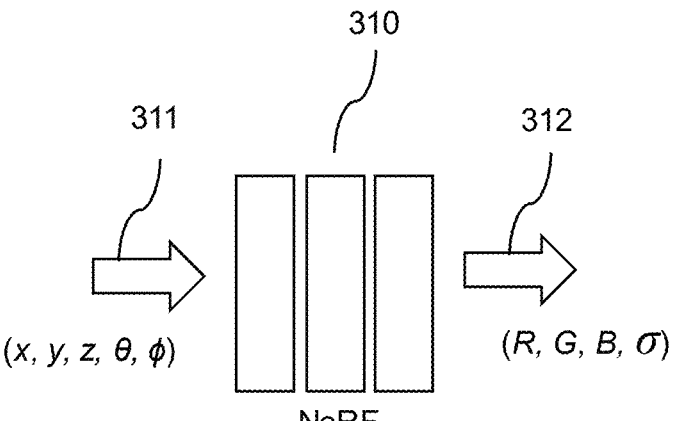

With reference to FIGS. 1A-1B, shown are workflow diagrams of method 100 of the disclosed invention for labeling two-dimensional (2D) data using a three-dimensional (3D) model. With reference to FIG. 2, shown is a diagram of an embodiment of system 200 of the disclosed invention, which is configured to label 2D data using a 3D model. With reference to FIG. 3, shown is a diagram of another embodiment of system 200' of the disclosed invention, which is configured to label 2D data using a 3D model. With reference to FIGS. 4A-4B, shown are diagrams illustrating Neural Radiance Fields (NeRF) optimization and view generation processes. The method 100 and system 200, 200' of the disclosed invention may be useful for labeling 2D Electro-Optical (EO) data for training artificial intelligence and machine learning (AI/ML) 3D models.

Referring to FIGS. 2-3, the systems 200 and 200' for labeling 2D data using a 3D model include computing devices 210 and 210', respectively, such as computers and servers. Each of the computing devices 210 and 210' includes at least one processor 211 and one or more non-transitory computer readable storage media 212. Each computing device 210, 210' also at least one network adapter 213 for data communications through networks, input/output adapter 214 for additional data communications and graphic user interface (GUI), and one or more interfaces 215 to communicate with external computer devices. The computing devices 210, 210' may further include graphic processing unit (GPU) 216. The systems 200, 200' further include 3D modeler platforms 230, 230' and 3D simulator platforms 240, 240' that are configured to perform image rendering and labeling processes.

In the system 200 shown in FIG. 2, the system 200 further includes 3D modeler device 231 for storing 3D modeler platform 230 and 3D simulator device 241 for storing 3D simulator platform 240. The computing device 210 is configured to interact and communicate with the 3D modeler device 31 and the 3D simulator device 241 through the one or more interfaces 215. In the system 200' shown in FIG. 3, the computing device 200' is configured to include the 3D modeler platform 230' and the 3D simulator platform 240'. The 3D modeler platform 230' and the 3D simulator platform 240' may be integrated with elements of the computing device 200' to perform image rendering and labeling processes. Each of the 3D modeler device 231 and the 3D simulator device 241 may be a computer device, such as computers and servers, which includes at least one processor (not shown) and one or more non-transitory computer readable storage media (not shown) that store instructions causing the processor to perform its own functions. The one or more storage media 212 of the computing devices 210, 210' may store instructions to control the 3D modeler platform 230, 230' and the 3D simulator platform 240, 240' and to perform overall processes of image rendering and labeling by using the 3D modeler platform 230, 230' and the 3D simulator platform 240, 240'.

The systems 200, 200' further include one or more imaging devices 220 to capture various images of desired object or scene 222. The one or more imaging devices 220 may be cameras and/or video recorders such as camcorders and are configured to capture images and/or videos of the desired object or scene 222. The computing devices 210, 210' are coupled to the one or more imaging devices 220 to receive captured images and/or videos from the imaging devices 220. In an embodiment, the computing devices 210, 210' may control the imaging devices 220, for example, to set camera positions over the desired object or scene 222. The computing devices 210, 210' may be coupled to the imaging devices 220 through networks or any other communication tools such as wired or wireless communication connections. The one or more imaging devices 220 may be placed near the desired object or scene 222 of interest or may be placed in any types of vehicles that move around the desired object or scene 222. Examples of the vehicles include unmanned aerial vehicles (UAV) including drones, aircraft, helicopters, any types of land-based vehicles such as automobiles, boats, submarines, spacecraft, and satellites. The desired object or scene 222 may be any objects or scenes on land, on the water or underwater. The imaging devices 220 may capture images of various sides the desired object or scene 222 at various angles, distances, and depths, creating a set of input views of the desired object or scene 222. The captured images and/or videos 221 are transmitted to the computing devices 210, 210' for labeling 2D view data of the desired object or scene 222 from 3D data.

Referring to FIG. 1A, to generate synthetic labeled images of a desired object or scene 222, a dataset of real images of the desired object or scene 222 is needed. Images and/or videos of the desired object or scene 222 are captured by using the imaging device 220, block S101. The captured images and/or videos are transmitted to the computing device 210, 210' from the one or more imaging devices 220. Images are collected and/or extracted from the captured and transmitted images and/or videos via the computing device 210, 210', block S102. For example, when videos of the desired object or scene 222 are captured and transmitted, the computing device 210, 210' may extract a subset of the images (e.g., every one (1) second of the video) from the videos. These images may need to have minimal or no motion blur.

These collected images are processed to label the 2D data of the desired object or scene 222 using a 3D model. The collected images are 2D images (or views) of the desired object or scene 222. FIG. 4A exemplarily illustrates 2D views 301a-301e that are images of various sides of the object or scene 303 of interest which corresponds to the object or scene 222 in FIGS. 2-3. The reference numeral 302a refers to a pixel in the 2D view 301a. The next step is to generate a 3D model of the desired object 303 by using the captured 2D images 301a-301e. The 2D images 301a-301e of the desired object or scene 303 are input to 3D modeler platforms 230, 230' to create a 3D model from these 2D images 301a-301e. The method and system of the disclosed invention utilize Neural Radiance Fields (NeRF) to synthetize new views of the desired object or scene from the set of input 2D views 301a-301e. The 3D modeler platforms 230, 230' have the functionality of generating and optimizing NeRF neural network representing the scene portrayed by the input 2D views, a NeRF that can be used to generate novel views of the scene. An example of the 3D modeler platforms 230, 230' is Instant-Neural Graphics Primitives (NGP) platform from NVIDIA. By using the 3D modeler platform 230 or 230', NeRF function of the scene captured by the 2D input views 301a-301e is generated and optimized, block S103, as described below. Neural network is used to encode a continuous and volumetric representation of a scene, and volume rendering is used to do view synthesis.

Referring to FIGS. 4A-4B, a pixel 302a of the 2D view 301a is associated with a marching camera ray 304 that extends from the camera viewpoint 306a through the pixel 302a. A set of sampling points 305 is generated along the camera ray 304 to determine whether a certain density level is exhibited at the location of the corresponding sampling points 305. Each sampling point 305 is represented by 5D coordinate input (x, y, z, θ, φ) 311 consisting of the spatial location (x, y, z) of the sampling point 305 in space and the viewing orientation (θ, φ) of the sampling point 305 along the camera ray 304 looking at the object 303 through the orientation. The 5D coordinate input (x, y, z, θ, φ) 311 of the sampling point 305 is input into the NeRF neural network 310. The output 312 of NeRF 310 is a set (R, G, B, σ) 312 of volumetric density (σ) and the emitted radiance or color (R, G, B) of the sampling point 305. Then, by using volume rendering techniques, the densities and colors of the sampling points 305 are accumulated into Red Green Blue (RGB) values, and those values are compared to the RGB values of the input image's pixel using loss function (L2 distance). The NeRF is optimized by reducing the loss function using gradient decent to update the weights of the NeRF network. This process is repeated for every pixel 302a in the 2D image 301a and for every 2D images 301a-301e and it is repeated over all the pixels of all images again and again until reaching a low and acceptable value of the loss function. In this way, the NeRF network is trained and deliberately overfitted to the scene in hand. To render NeRF views we march camera rays through the scene following the previous process without the loss optimization phase to render 2D images.

The optimized NeRF is used to generate a mesh via the 3D modeler platform 230, block S104. The mesh may be generated by using, for example, marching cubes algorithm. The marching cubes algorithm creates a polygonal surface mesh, which is a representation of an iso-surface of a 3D scalar field, from a 3D scalar field by marching a cube through the 3D space to determine configurations for the given cube. The marching cubes algorithm is disclosed in U.S. Pat. No. 4,710,876.

The disclosed invention uses an original set of images and/or videos that capture a complex scene containing objects of interest on which an object detection algorithm needs to be trained. Optimizing NeRF requires extracting, from the original set of the images, the 3D structure of an object or scene 222 that consists of a set of 3D points from the object or scene 222, and extracting a set of camera poses estimating from which position in the world each of the input images has been taken. A structure-from-motion (SFM) algorithm is run on the input 2D images, using the COLMAP tool or OpenDroneMap (ODM), to generate the camera positions needed to optimize the NeRF. The 3D modeler platform 230 (e.g., Instant-NGP platform) is configured to provide the capability to run COLMAP's SFM algorithm, to optimize the NeRF representing the object or scene, and to export the NeRF as a mesh. Through optimization techniques, such as using parametric encoding of input coordinate, the Instant-NGP platform, for example, makes optimizing NeRF significantly faster than the original NeRF algorithm, usually completing within minutes. When Instant-NGP platform is used for the 3D modeler platform 230, the computing device 210, 210' may operate using instant-NGP's command line interface.

The mesh from the 3D modeler platform 230 is used by the 3D simulator platform 240, such as NVIDIA Omniverse™, to generate bounding boxes. This is done in two distinct steps. First, using the 3D modeler platform mesh as a guide, new mesh objects are created to represent the targets as seen on the 3D modeler platform mesh. This can be done directly in the 3D simulator platform 240, or other modeling software, such as Blender. Second, the 3D modeler platform mesh and the target meshes are all input into the 3D simulator platform 240. In the 3D simulator platform 240, the camera can be adjusted to get the desired angle and view of the mesh. Then the 3D simulator platform 240 uses the location of the targets to generate bounding boxes and render labeled images, in addition to other information such as the camera position and angle. Labeling is a type of data labeling that focuses on identifying and tagging specific object of interests, such as a person or a vehicle, in an image. The dimensions of a bounding box engulfing an object of interest along with a label designating the type of class the object belongs to are recorded for each target object in the image. In general, AI/ML models employ ground truth labels while learning to compare the output of the models to the ground truth labels in order to optimize a loss function.

In order to extend the existing dataset of images, one or more new camera poses are generated or selected to create additional images of the desired scene for additional labeling, block S105. The new camera poses may be represented by positions and orientations (or angles) of virtual cameras looking at the scene 303 through the orientations. The scene 303 may include multiple objects and those are labeled, and each input view or image could have many of these objects. These new camera poses include positions and orientations of cameras that are not used for the initial set of the input views 301a-301e of the desired scene 303. By using the new camera pose, synthetic images are to be generated to extend and diversify an existing dataset of real images that are captured by the imaging device 220. The synthetic images are additional images of the desired scene 303, which are not captured by the imaging devices 220 but are synthesized for additional labeling. Therefore, the synthetic images may include views of the scene that are different from the views in the collected images, i.e., images taken from angles different of the angles of the input views. In an embodiment, the computing devices 210, 210' may generate the new positions and orientations of cameras for the new camera poses based on position and orientation information of the initial set of input views 301a-301e of the desired object 303. The computing devices 210, 210' may determine the new positions and orientation of cameras that may be needed to efficiently extend the dataset of the 2D views to increase AI/ML models' accuracy. Alternatively, the new positions and orientation of the cameras may be chosen by a user.

The 3D simulator platform 240 generates labeled images with bounding boxes, block S106, by using the generated positions and orientations of cameras in block S105. The 3D modeler platform 230 renders NeRF views via the 3D modeler platform 230 to create synthetic NeRF views, block S107, by using the new camera positions and orientations that are generated in block S105. The bounding boxes generated by the 3D simulator platform 240 for from the mesh are overlaid with the corresponding NeRF synthetic NeRF views via the computing devices 210, 210', block S108, in order to verify that the bounding boxes created in mesh view correctly align with the corresponding objects of interest in the NeRF rendered images. The labels generated by the 3D simulator 240 for the corresponding views are saved as valid labels and metadata to the synthetic NeRF views. The labeled 2D data are used for training artificial intelligence and machine learning (AI/ML) models.

After importing the NeRF mesh into the 3D simulator platform 240 (e.g., NVIDIA's Omniverse™ platform), a camera in the 3D simulator platform 240 may be positioned anywhere around the imported scene and generate bounding boxes around objects. When Instant-NGP platform is used for the 3D modeler platform 230 and NVIDIA's Omniverse™ platform is employed for the 3D simulator platform 240, the camera pose may be generated by the Omniverse™ platform as a transformation matrix, while the Instant-NGP platform may expect the camera pose to be represented using a quaternions vector and a translation vector.

The system 200, 200' of the disclosed invention is configured to provide instruction codes to convert the transformation matrix to quaternions format (quaternions vector and a translation vector) to adjust its axes to align with the Instant-NGP platform's coordinate system. The computing devices 210, 210' are configured to convert data formats of the 3D simulator platform 240 into data formats of the 3D modeler 230 platform, and vice versa.

The system of the disclosed invention also calculates the vertical field of view (FOV) of the camera that is required by Instant-NGP, using the camera's horizontal aperture, resolution height and width, camera height, and focal length provided by the Omniverse™ platform, as shown below.

$$\text{sensor\_height} = (\text{horizontal\_aperture} * \text{resolution\_height}) / \text{resolution\_width}$$

$$\text{sensor\_height\_2} = \text{sensor\_height} / 2$$

$$\text{vfov\_rad} = 2 * \arctan(\text{sensor\_height\_2} / \text{focal\_length})$$

$$\text{vfov\_deg} = \text{rad 2deg}(\text{vfov\_rad}),$$

where vfov_rad is vertical field of view (vfov) in radian and vfov_deg is vfov in degree.

With the camera position converted to the right format and the vertical FOV calculated, the system of the disclosed invention generates a config file required by the Instant-NGP platform to render a video from the NeRF using the camera position. From the rendered video, the first frame may be extracted, which is the desired novel NeRF view (RGB image). The bounding boxes generated by Omniverse™ are aligned perfectly with the corresponding objects in the NeRF view (RGB image), creating by so a new labeled image not seen in the original images and/or videos, and hence extending the training dataset. Through these processes, the method and system of the disclosed invention generate labeled imagery from angles, zoom levels, and positions that were not captured in the original data, while maintaining high quality of images.

Hence, the disclosed invention offers the capability of augmenting a set of real images to create a more diverse training dataset that captures the scene and its objects from various new camera positions and angles, while maintaining high quality of images. The disclosed invention uses the 3D modeler platform 230 (e.g., Instant-NGP platform) for NeRF generation and new synthetic NeRF views rendered with newly generated camera positions and angles. The disclosed invention uses the 3D simulator platform 240 (e.g., NVIDIA's Omniverse™ platform) to generate bounding boxes around desired objects with the newly generated camera positions and angles.

The inventive concept for the disclosed invention is the ability to create labels in 3D simulator platform 240 (e.g., NVIDIA's Omniverse™ platform) for images that are synthesized from NeRF views in 3D modeler platform 230 (e.g., Instant-NGP platform). Instant-NGP platform, for example, can generate new images of an object or scene from non-captured angles but cannot label the rendered images. Omniverse™ platform, for example, can label images taken from any angle in the scene's NeRF mesh generated by Instant-NGP platform, but cannot render high-quality images. Therefore, the disclosed invention takes the chosen angle from Omniverse™ platform and uses it in Instant-NGP platform to render a high-quality image that aligns perfectly with the labels generated by Omniverse™ platform.

Returning to FIGS. 2-3, the systems 200, 200' of the disclosed invention for labeling 2D data using a 3D model include one or more imaging devices 220 configured to capture images and/or videos of a desired object or scene 222 and computing devices 210, 210' coupled to the one or more imaging devices 220 to receive the captured images and/or videos. Each of the computing devices 210, 210' includes at least one processor 211 and one or more non-transitory computer readable media 212 including instructions that cause the processor 211 to execute operations that are described above and shown in FIGS. 1A-1B.

Figures 5A, 5B:
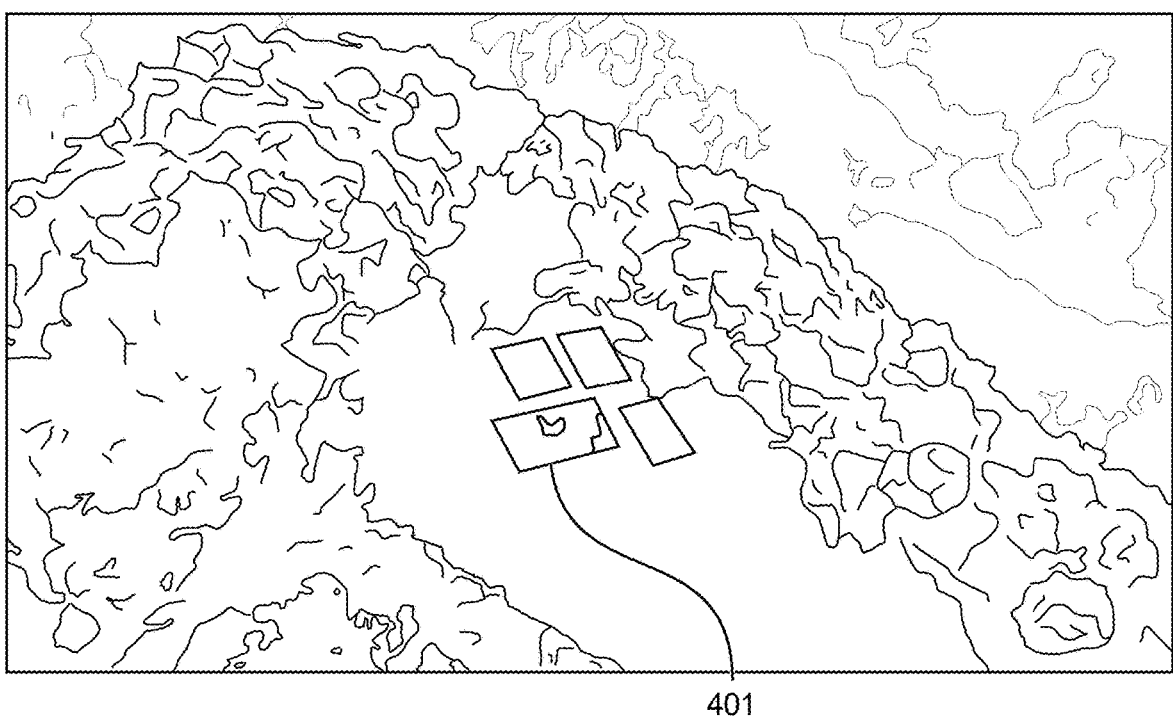
FIGS. 5A-5B are examples of images that are produced by using the method and system of the disclosed invention.

With reference FIGS. 5A-5B, shown are examples of images that were produced by using the method 100 and system 200 described above. Images of an outdoor grassy environment and colored tarps, which are placed on the ground, were collected by using commercial off the shelf (COTS) unmanned aerial vehicle (UAV). The tarps in this test constitute the objects of interest to be labeled. A NeRF representing the scene was generated by using Instant-NGP platform, and the NeRF was converted into a mesh. The mesh was imported into NVIDIA Omniverse™ platform. A random angle was picked, and a new camera pose was generated from the angle. Bounding boxes were created around the tarps by the Omniverse™ platform. The camera poses and field of view (FOV) used in the Omniverse™ platform were converted into formats that conform with the Instant-NGP platform. Images were rendered, via the Instant-NGP platform, by using the converted formats of the camera poses and FOV. Bounding boxes were overlaid on the corresponding rendered images by using the same locations and dimensions of the bounding boxes provided by the Omniverse™ platform. FIG. 5A shows a mesh view 401 of the scene within the Omniverse™ platform, with bonding boxes drawn on the tarps and FIG. 5B shows rendered image with bounding boxes 403 overlaid on the tarps 402 in the Instant-NGP platform. FIG. 5B shows that the bounding boxes 403, which are created by the Omniverse™ platform, are well aligned with the tarps 402 in the rendered image.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A method for labeling 2D data by using a 3D model, comprising:

capturing images and/or videos of a desired object or scene by using one or more imaging devices;

collecting images of the desired object or scene from the captured images and/or videos;

generating and optimizing Neural Radiance Fields (NeRF) of the desired object or scene based on the collected images of the desired object or scene by using a 3D modeler platform;

converting the NeRF into a mesh via the 3D modeler platform;

generating one or more new camera poses comprising positions and orientations of cameras, wherein the one or more new camera poses include poses that are not used for the collected images;

generating labels for the mesh via a 3D simulator platform, wherein the labels comprise bounding boxes around the desired objects;

rendering the labeled images from the mesh by using one or more of the new camera poses via the 3D simulator to create labeled synthetic images;

rendering synthetic images from the NeRF via the 3D modeler platform by using the new camera poses; and overlaying bounding boxes of the synthetic images rendered from the mesh with corresponding synthetic NeRF views.

2. The method of claim 1 wherein one or more imaging devices comprise cameras and/or video recorders.

3. The method of claim 1 wherein the NeRF views are converted into a mesh by using a marching cubes algorithm.

4. The method of claim 1 wherein the generating labels for the mesh comprises:

identifying the mesh representing the desired objects;

calculating the bounding boxes for the for the desired objects based on their positions; and cropping out the sections of the images in mesh.

5. The method of claim 1 wherein the labeled synthetic images comprise views of the desired object or scene that are not included in the collected images.

6. The method of claim 1 wherein the 3D modeler platform comprises instructions that cause at least one processor to execute operations to generate and optimize the NeRF of the desired object or scene based on the collected images of the desired object or scene, which comprise:

generating sampling points of each pixel of the collected images of the desired object or scene, wherein each sampling point is represented by a spatial location and a viewing orientation along a camera ray; and producing an output set of a density and a color of each sampling point based on the location and viewing orientation of the sampling point.

7. The method of claim 1 wherein the 3D simulator platform comprises instructions that cause at least one processor to execute operations comprising labeling process of images, which comprise:

obtaining positions of desired objects from the mesh representing the desired objects;

creating new mesh objects to represent the targets as seen on mesh by use the positions;

generating bounding boxes; and rendering labeled synthetic images from the mesh and targets by converting the 3D positions into 2D based on camera position and angle.

8. The method of claim 1 further comprising obtaining field of view (FOV) for the new camera poses based on the camera's horizontal aperture, resolution height and width, height, and focal length which are provided by the 3D simulator.

9. The method of claim 8 further comprising converting a data format of the 3D simulator platform into a data format of the 3D modeler platform, wherein the data formats of the 3D simulator platform and the 3D modeler platform comprise information of the one or more new camera poses and the FOV.

10. A system for labeling 2D data in 3D model, comprising:

one or more imaging devices configured to capture images and/or videos of a desired object or scene; and at least one computing device coupled to the one or more imaging devices to receive the captured images and/or videos, wherein the at least one computing device comprises at least one processor and one or more non-transitory computer readable media including instructions that cause the at least one processor to execute operations to label 2D data in 3D model, the operations comprising:

receiving the captured images and/or videos from the one or more imaging devices;

collecting images of the desired object or scene from the captured images and/or videos;

generating and optimizing Neural Radiance Fields (NeRF) of the desired object or scene based on the collected images of the desired object or scene by using a 3D modeler platform;

converting the NeRF views into a mesh via the 3D modeler platform;

generating one or more new camera poses comprising positions and orientations of cameras, wherein the one or more new camera poses include poses that are not used for the collected images;

generating labels for the mesh via a 3D simulator platform, wherein the labels comprise bounding boxes around the desired objects;

rendering the labeled images from the mesh by using one or more of the new camera poses via the 3D simulator to create labeled synthetic images;

rendering synthetic images from the NeRF via the 3D modeler platform by using the new camera poses; and overlaying bounding boxes of the synthetic images rendered from the mesh with corresponding synthetic NeRF views.

11. The system of claim 10 wherein one or more imaging devices comprise cameras and/or video recorders.

12. The system of claim 10 wherein the NeRF views are converted into images in mesh views by using a marching cubes algorithm.

13. The system of claim 10 wherein the generating labels for the mesh comprises:

identifying the mesh representing the desired objects;

calculating the bounding boxes for the for the desired objects based on their positions; and cropping out the sections of the images in mesh.

14. The system of claim 10 wherein the labeled synthetic images comprise views of the desired object or scene that are not included in the collected images.

15. The system of claim 10 wherein the 3D modeler platform comprises instructions that cause at least one processor to execute operations to generate and optimize the NeRF of the desired object or scene based on the collected images of the desired object or scene, which comprise:

generating sampling points of each pixel of the collected images of the desired object or scene, wherein each sampling point is represented by a spatial location and a viewing orientation along a camera ray; and producing an output set of a density and a color of each sampling point based on the location and viewing orientation of the sampling point.

16. The system of claim 10 wherein the 3D simulator platform comprises instructions that cause at least one processor to execute operations comprising labeling process of images, which comprise:

obtaining positions of desired objects from the mesh representing the desired objects;

creating new mesh objects to represent the targets as seen on mesh;

generating bounding boxes; and rendering labeled synthetic images from the mesh and targets by converting the 3D positions into 2D based on camera position and angle.

17. The system of claim 10 wherein the operations further comprise obtaining field of view (FOV) for the new camera poses based on the camera's horizontal aperture, resolution height and width, height, and focal length which are provided by the 3D simulator.

18. The system of claim 17 wherein the operations further comprise converting a data format of the 3D simulator platform into a data format of the 3D modeler platform, wherein the data formats of the 3D simulator platform and the 3D modeler platform comprise information of the one or more new camera poses and the FOV.

* * * * *